INVENTORS
SHINSUKE SASABUCHI
TADASHI SASAKI
ISAO KAWADA
BY
Bailey, Stephens & Huettig
ATTORNEYS

United States Patent Office 3,282,140
Patented Nov. 1, 1966

3,282,140
METHOD OF AND APPARATUS FOR AUTO-
MATICALLY CUTTING A GLASS RIBBON
Shinsuke Sasabuchi, Tadashi Sakaki, and Isao Kawada,
Kitakyushu, Japan, assignors to Asahi Glass Co., Ltd.,
Tokyo, Japan, a corporation of Japan
Filed Feb. 26, 1965, Ser. No. 435,484
Claims priority, application Japan, Feb. 29, 1964,
39/11,010
5 Claims. (Cl. 83—7)

The present invention relates to a method of and apparatus for automatically cutting a glass ribbon. More particularly, it relates to a method of and apparatus either for cutting tranversely a continuously moving glass ribbon in a direction perpendicular to the direction of its moving pathway or simply producing on the said moving glass ribbon transverse score line.

The present invention intends to provide a method of and apparatus for producing transverse score lines on a moving glass ribbon formed continuously in the form of ribbon from the molten glass, during movement of said glass ribbon and to solve substantially some difficulties in the recurrent cutting of this sort of glass ribbon.

It is an object of the present invention to score transversely a glass ribbon, which has been formed continuously from the molten glass and then subjected sufficiently to an appropriate annealing, at the final end of annealing zone, and to crack-off the glass ribbon along the scored line.

Another object of the present invention is to score successively a glass ribbon formed continuously from the molten glass and being conveyed in the predetermined direction by way of a conveyor, at constant intervals and to crack-off the scored glass ribbon into desired sizes.

A further object of the present invention is to produce recurrently score line for cracking-off glass ribbon in the desired sizes by laying a guide-rail of the cutter oblique to the travelling direction of the glass ribbon moving in the predetermined direction on the conveyor and causing a cutter to run along the guide rail at a speed proportional to the advancing speed of the said glass ribbon.

Still another object of the present invention is to cut-off recurrently in an accurate size glass ribbon which has been withdrawn continuously from the molten glass and then subjected sufficiently to annealing and cooled.

According to the present invention, in such cutting, the guide rail for the cutter is mounted in a direction oblique to the advancing pathway of the glass ribbon being carried forward in the predetermined direction by means of the conveyor, the both ends of the said rail being fixed unmovably or stationarily, and the cutter is attached to this guide rail in such a way that score line is produced on the surface of the glass ribbon in the direction perpendicular to the moving pathway of the aforesaid glass ribbon by means of the said cutter which runs always on the guide rail at the proportional speed to the advancing speed of the glass ribbon.

According to the invention, there is provided an automatic glass cutting apparatus which comprises a conveyor, which carries the glass ribbon loaded thereon forward in the predetermined direction, a cutting mechanism which serves to score the glass ribbon recurrently at the predetermined intervals in a direction perpendicular to the travelling direction of the glass ribbon, a pulse motor for the purpose of driving the said cutting mechanism and a controlling device which, after detecting the advancing speed of the said glass ribbon, translates this into the pulses and causes such pulse motor to actuate regularly and successively.

In the present invention, the said cutting mechanism is principally constituted by guide rail provided in a direction oblique to the moving pathway of the glass ribbon to be carried forward in the predetermined direction by way of the conveyor and a cutter capable of making a reciprocating movement along the said rail. This cutter moves from one edge to the opposite edge of the said glass ribbon at the time of the forward phase of the said reciprocating movement while contacting with the glass ribbon in the course of movement of the predetermined direction whereby transverse scoring line is recurrently produced on the glass ribbon by means of the said cutter, and after reversing the direction at the extreme end of the guide rail, this cutter returns to its initial position and provides for the next cutting operation. The predetermined scoring of the said glass ribbon is effected during one reciprocating movement of the cutter on the guide rail, and the time period, during which time the cutter makes a reciprocating movement corresponds to the time for the said glass ribbon to advance on the conveyor the length of the cutting size.

The glass ribbon conveyed continuously by means of the conveyor is cut recurrently in the determined equal size by the repetition of the cutting operation as described above. Furthermore, according to the present invention the above-mentioned cutter is driven by a pulse motor. The pulses are sent into the pulse motor, after the advancing speed of the glass ribbon being carried forward by way of the conveyor is detected, and then the detected speed is transferred to the pulses by a pulse generator. The said pulse motor is so constituted as to be able to actuate in conjunction to the pulses and to move or actuate the cutter at an adequate cutting speed.

Moreover, according to the cutting apparatus of this invention, it is possible to cut the glass ribbon produced continuously from the molten glass and subsequently withdrawn as in the case of the Colburn method, the Ford method, the Float method, Pittsburgh method, or Fourcault method, into the desired size in a continuous manner and consequently, this invention is considerably convenient.

In order to enable the invention to be more readily understood, reference is now made by way of example to the accompanying drawings, in which.

Figure 1:
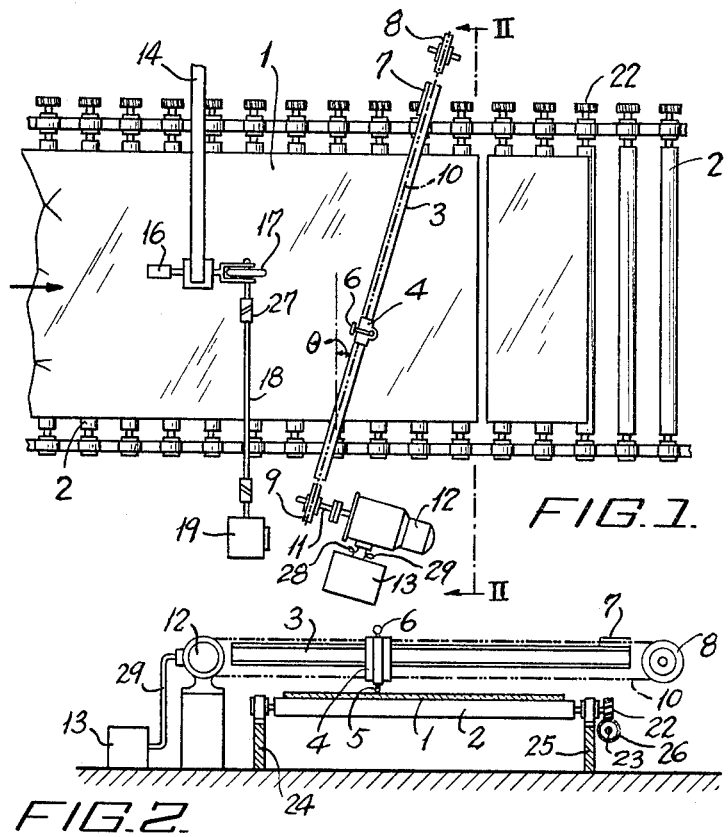
FIG. 1 is a plan view of an apparatus for automatically cutting glass ribbon of the present invention.
Figure 2:
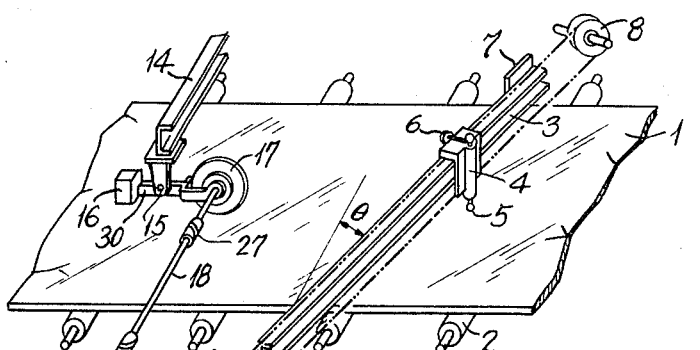
FIG. 2 is a sectional view taken on the line II—II of FIG. 1.
Figure 3:
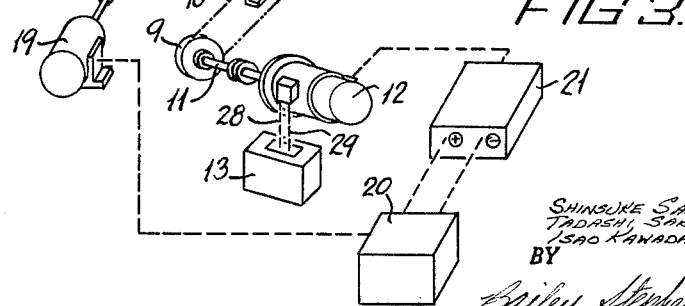
FIG. 3 is a perspective view showing the cutting place of the apparatus for automatically cutting glass ribbon shown in FIG. 1.

FIG. 1, FIG. 2 and FIG. 3 respectively show the cutting position or place at the time when the shaped glass ribbon 1 withdrawn continuously and transversely from the molten glass as is the case in the Colburn method, the Ford method or the Float method, is cut and particularly, the details of cutting position will be apparent from FIG. 3. The said glass ribbon 1 is produced continuously from the molten glass in the forming stage and subsequently carried into an annealing lehr arranged adjacent the forming stage, and annealed therein while being passed through the said lehr in the predetermined direction by way of the conveyor. The glass ribbon thus annealed is cut into the desired size at the cutting position disposed at the final end of the said annealing lehr.

It is preferred to use roller conveyors as conveyors to be arranged in the annealing lehr and in the cutting position at the end thereof, and such roller conveyor is widely used because of its convenience. 2 shows the conveyor rollers. These rollers are rotatably mounted on supporting stands 24 and 25 parallel to one another. All of these rollers or the majority thereof rotate under the condition that helical gear 22, which is provided on their rotating shaft, meshes with worm gear 26 attached to a driving shaft 23 which is rotated as a constant speed by an electric motor (not shown). The said glass ribbon 1 is conveyed or carried forward from left to right (in FIG. 1) while being loaded on the roller conveyor and cut into the desired size by the cutter during its movement. A guide rail 3 is laid or bridged in a direction oblique to the direction of travelling pathway of the glass ribbon 1 across and above the conveyor roller 2 with a definite distance and the both ends of the said rail are fixed stationarily or unmovably. Assuming an inclination angle subtended by the said guide rail 3 oblique to the direction of the travelling pathway of the glass ribbon 1 to be $\theta$ and it is used hereinafter as the inclination angle. As described later, this inclination angle $\theta$ of the guide rail 3 will be changed at the time when the speed of the cutter 5 is adjusted by the requirements such as the advancing speed of the glass ribbon, the length of the cutting size and the like. A cutter holder 4 is provided on the guide rail 3 so as to be able to move or displace freely along the guide rail 3, and the cutter 5 is attached to the said cutter holder 4 so as to be able to come in contact or out of contact with the glass ribbon 1 by means of a spring, air cylinder and the like and thus, to make upward and downward movements in a given stroke, and a part of the said cutter holder 4 is connected to an endless chain 10 which is provided around sprocket wheels 8 and 9 respectively disposed at the both ends of the said guide rail 3. This sprocket wheel 9 is joined to a rotating shaft 11 of a pulse motor 12 and the said endless chain 10 can be driven by rotation of the pulse motor. This being the case, it is possible for the cutter 5 to make a reciprocating movement along the guide rail 3, together with the cutter holder 4 through the endless belt 10. That is, the cutter 5 moves toward the right direction along the guide rail 3, when the sprocket wheel 9 is rotated in a clockwise direction by means of the pulse motor 12 and then returned to its initial position by running back toward the left direction after changing the direction at the end of the guide rail 3, when the sprocket wheel 9 is rotated in an anti-clockwise direction by the reverse rotation of the pulse motor 12. In general, when the cutter 5 makes a reciprocating movement, the cutter 5 comes, at the forward phase, in contact with the glass ribbon 1 which is in movement from left to right in FIG. 1 on the travelling pathway constituted by the roller conveyor and thus, the cutter 5 runs from one edge of the said glass ribbon 1 to opposite edge while keeping contact with the glass ribbon and scores the surface of the glass ribbon over its whole width in the direction perpendicular to the glass travelling pathway and on reaching the end of the guide rail 3, the said cutter 5 stops temporarily or for a given time, and then after changing its direction, the said cutter moves on the guide rail 3 toward the left direction until it returns to the initial position, and then, provides for the next cutting operation. The cutter 5 in effecting the cutting operation is supported in such a manner that the said cutter is brought into contact with the glass ribbon under given pressure and the buffer action can be afforded against the shock or impact resulting from the surface conditions of the glass ribbon and from the external force received from the outside, in order to produce uniformly such a score line on the surface of the glass ribbon as the glass ribbon can easily be cracked-off or cut-off along the scored line. To this end, the cutter 5 is usually supported in the cutter holder 4 by means of the spring, the air cylinder or their combination, and the aforesaid pressure upon the glass ribbon 1 is controlled at any time by the thickness of the glass ribbon, the cutting speed of the cutter 5 or others.

When the cutter 5 traverses on the glass ribbon and reaches the opposite end of the guide rail while being guided by the guide rail and scoring the glass ribbon 1 at the forward and backward movement, a lug 6 of the cutter abuts against a cutter-lifting device 7 provided at the end of the said guide rail, and is lifted. This state is also maintained at the next returning movement and then the cutter runs back, apart from the glass ribbon 1, along the guide rail 3 toward its initial position.

Figure 4:
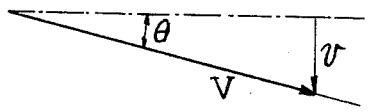
FIG. 4 is an explaining view showing relation among the inclination angle $\theta$ of the guide rail for the cutter in FIG. 1, the advancing speed $v$ of the glass ribbon and cutting speed V of the cutter.

In the cutting mechanism as described above, the aforesaid inclination angle $\theta$ of the guide rail 3 has some definite mutual relations between the advancing speed of the glass ribbon 1, and the cutting speed of the cutter 5. Namely, in order to cause the cutter 5 to run along the guide rail 3 bridged obliquely to the advancing direction of the glass ribbon 1 and to produce the score line on the glass ribbon in the direction perpendicular to its advancing direction, the cutter 5 must run at a constant relative speed, which can be determined by the cutting speed of the cutter, the advancing speed of the glass ribbon and the said inclination angle $\theta$ of the guide rail 3. As shown in FIG. 4, this relation provides the formula $v/V = \sin \theta$, wherein $v$ and $V$ respectively represent the advancing speed of the glass ribbon 1 and the cutting speed of the cutter 5. If the advancing speed $v$ of the glass ribbon and the inclination angle $\theta$ of the guide rail 3 are given, the cutting speed $V$ of the cutter 5 can be determined as $V = v/\sin \theta$.

When the cutting speed $V$ of the cutter 5 does not keep this relation, the score line produced on the glass ribbon may be either bent or does not keep the direction perpendicular to the advancing pathway of the glass ribbon. Accordingly, the cutting speed $V$ at the time of the cutting operation must always maintain the said relation. For this reason, in order to produce score line recurrently at definite intervals on the glass ribbon 1 being continuously carried forward by the conveyor, it is required to detect the advancing speed of the glass ribbon 1 and to cause the cutter 5 to run along the guide rail 3 so as to satisfy the above-mentioned relation $V/v = \sin \theta$.

In general, the advancing speed of the glass ribbon at the cutting position or place, which is continuously carried forward or conveyed while being loaded on the roller conveyor can be determined substantially by the glass ribbon making speed in the formation stage of the glass ribbon. This speed for making glass ribbon 1 mainly varies, depending on the thickness of glass ribbon. Accordingly, if the thickness of glass ribbon is given, the said advancing speed of the glass ribbon 1 is approximately determined, and the glass ribbon 1 reaches the cutting position at substantially the same speed as the said speed.

The advancing speed at the cutting place of this glass ribbon 1 is substantially the same as the peripheral speed of the conveyor roller, when there is no slip between the conveyor roller 2 and the glass ribbon 1. Consequently, the advancing speed of the glass ribbon 1 at the cutting place can be taken out as its revolution numbers of these conveyor rollers when the conveyor rollers are used each of which has respectively a definite diameter.

However, the advancing speed of the glass ribbon at the cutting place may be changed by a slight irregularity due to an unforeseen accident in the formation stage or the conveyor, or by conscious change in the manufacturing speed for the adjustment of the thickness of the glass ribbon even though it is of very slight degree or by other reasons. In the process as described above, the slip is liable to occur at the contact part between the conveyor roller 2 and the glass ribbon 1, and sometimes it is very difficult to detect accurately such a slight change in speed. Such being the case, in the apparatus of the present invention, there is provided a speed-detecting means for detecting a speed for the purpose of measuring more accurately the advancing speed at or near the cutting place of the glass ribbon 1 being carried forward in the predetermined direction by the conveyor rollers 2 while being loaded thereon. In FIG. 1 and FIG. 3, this detecting means is shown as a detecting roller or wheel 17 having the definite diameter.

As clearly understandable from FIG. 3, this detecting means is so constituted as to be able to measure the advancing speed of the glass ribbon 1 as the revolution number of the wheel 17. The detecting wheel 17 is attached to a holding lever 30 connected by, for example, a pin 15 loosely to a supporting member 14 which is located adjacent the advancing pathway of the glass ribbon 1 being carried forward by the conveyor rollers 2, in such a manner that the said detecting wheel 17 can rotate at substantially the same periphery speed as the advancing speed of the said glass ribbon. Thus, the detecting wheel 17 can be brought into contact with the glass ribbon under adequate pressure to such an extent that there is no slip at the contact part between the glass ribbon 1 and the detecting wheel 17, by the balance weight 16 set at the opposite position of the holding lever 30.

As described above, the measurement of the advancing speed of the glass ribbon is an important factor for determining the cutting speed of the cutter 5.

Accordingly, the said wheel 17 or at least, its outer peripheral portion which comes in contact with the glass ribbon 1, is made of the friction-resistant material, such as hard rubbery material which contacts closely with the glass ribbon 1 and has large contact friction with the glass ribbon at the contact part and is free from any such an undesired phenomenon as slip between the wheel 17 and the glass ribbon 1 and does not change its largest effective diameter contacting with the surface of the glass ribbon due to wearing in its use.

In the speed detection means as described above, when pressure of said wheel against the glass ribbon 1 is unnecessarily large, the glass ribbon 1 bends at this contact part or the diameter of the wheel 17 changes due to its excess pressure and moreover, there occurs an error in the revolution number of the wheel 17, with the result that the advancing speed of the glass ribbon 1 can not be measured accurately. On the other hand, when pressure of the wheel 17 against the glass ribbon 1 is insufficient, there occurs slip between the glass ribbon 1 and the wheel 17, and it becomes impossible to measure accurately the advancing speed of the glass ribbon 1 as is the case in excess pressing. As can be seen from the above description, the pressure of the wheel 17 against the glass ribbon is very important for detecting accurately the advancing speed of the glass ribbon. And the said pressure has to be controlled in conjunction with the advancing speed of the glass ribbon, and this pressure increases as the advancing speed of the glass ribbon becomes fast.

In this cutting apparatus, the control of the pressure of the wheel 17 against the glass ribbon can be easily achieved by changing the balance weight 16 or its position on the pin-supporting point. The control of the pressure as described above can also be likewise accomplished, by using other suitable spring or air cushion instead of the said balance weight 16.

In order to measure accurately the advancing speed of this glass ribbon, it is necessary to select the adequate diameter and the thickness of the wheel 17. For instance, the diameter of the wheel 17 is preferred to be 100 mm. to 200 mm. as the result of the practice.

The advancing speed of the glass ribbon 1 detected as its revolution number of the wheel 17 is transmitted to the pulse generator 19 through a rod 18 connected by a connector 27 to the rotating shaft of the said wheel 17. This pulse generator 19 is driven by means of the rotation of the wheel 17, and a definite number of the pulses are generated by one rotation of the said wheel 17. Accordingly, the advancing speed of the said glass ribbon 1 is transformed into the pulses by means of the pulse generator 19 and is detected as its frequency.

Therefore, it is possible to cause the cutter 5 to run along the guide rail 3 in conformity with the speed of the glass ribbon 1, by using the pulse motor, for example, an electrical oil pulse motor, which rotates by the definite degree of angle through one pulse. This electrical oil pulse motor 12 includes an electrical pulse motor which is rotated regularly by means of the said pulses and an oil motor in which oil supply for driving the oil motor is controlled by means of the said electrical pulse motor, and the driving power of the cutter 5 is obtained from the latter oil motor. That is, the said electrical-pulse motor, as shown in FIG. 3, controls the oil of the predetermined pressure applied to the said oil motor of the electrical oil pulse motor 12 from the oil compressor 13 through a tube 28 and causes this oil motor to rotate by regular revolution number in conjunction with the said pulse. The oil supplied for driving the said oil motor returns to the oil compressor from the said electrical oil pulse motor 12 through another tube 29, and then is supplied again to the electrical oil pulse motor 12 from the said tube 28 after being pressurized.

This pulse emitted from the said pulse generator 19 is, as shown in FIG. 3, sent to the auto-preset counter 20 for controlling the said electrical oil pulse motor 12 from this auto-preset counter 20 after passing through the motor controller 21. This auto-preset counter 20 is equipped with a plurality of control circuits, which are intended to cause the electrical oil pulse motor 12 to drive the cutter 5 in such a way that the said cutter can effect the cutting operation repeatedly and smoothly by its reciprocating movement along the guide rail 3.

In the following, reference is made to the construction and the function of this auto-preset counter 20 on the basis of FIG. 5.

Figure 5:
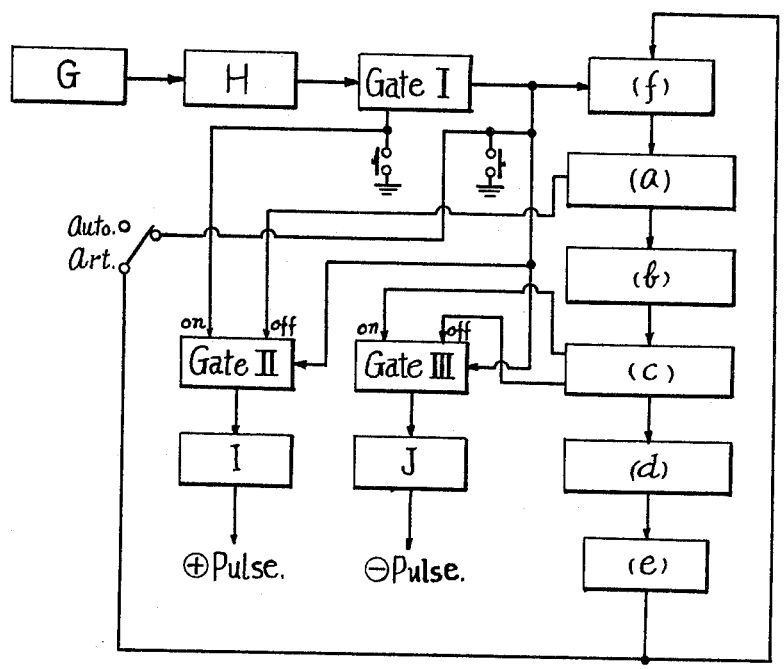
FIG. 5 is a flow diagram of the auto-preset counter in the present cutting apparatus.

As is apparent from FIG. 5, the auto-preset counter 20 is provided with control circuits $(a)$, $(b)$, $(c)$ and $(d)$, which are intended to control the electrical oil pulse motor 12 in such a manner that the cutter 5 effects the stages of "Cutting," "Stopping," "Returning" and "Waiting" successively and scores the glass ribbon during its reciprocating movement along the guide rail, as well as with a zero-return circuit $(e)$ which is intended to cause these circuits to be operated repeatedly and in these circuits $(a)$, $(b)$, $(c)$ and $(d)$, each of the set points for the actions necessary for the said cutting operation of the cutter 5 is set respectively as frequency of pulse. That is, the set point $a_1$ necessary for "cutting," namely the scoring of the glass ribbon effected by the cutter 5 at the time when said cutter moves across the glass ribbon while running along the guide rail 3, is set in the said circuit $(a)$; the set point $a_2$ for "stopping" of the cutter 5 at the side end of the guide rail 3 until the start of the return movement is commenced after completion of said "cutting," is set in the circuit $(b)$; the set point $a_3$ for "returning" for the cutter 5 to return to its original position, apart from the surface of the glass ribbon 1 along the guide rail 3 is set in the circuit $(c)$; and the set point $a_4$ for "waiting" for the cutter 5 to provide for the next cutting operation at its original position is set in the circuit $(d)$.

The said electrical oil pulse motor 12 operates in accordance with these set points $a_1$, $a_2$, $a_3$ and $a_4$ which are set in the circuit of the auto-preset counter 20, and the cutter 5 makes one reciprocating movement on the guide rail 3 in accordance with these set points, during which movement the first scoring of the glass ribbon is effected, and since the said control circuits $(a)$, $(b)$, $(c)$ and $(d)$ of the auto-preset counter 20 are successively repeated by the zero-return circuit $(e)$, the cutter 5 commences again the next cutting operation in accordance with the set points $a_1$, $a_2$, $a_3$ and $a_4$ set in the auto-preset counters 20. Consequently, the time in total of the said set points $a_1$, $a_2$, $a_3$ and $a_4$ is identical to the time, during which time the glass ribbon 1 advances by the length of the cutting size by means of the conveyor rollers 2. This time is also coincided with the time from the first cutting of the cutter 5 to the next cutting, namely the time necessary for one cutting operation.

It is evident that the time necessary for once cutting operation by the cutter 5 becomes shortened in accordance with either the reduction of the length of the cutting size or the decrease in the advancing speed of the glass ribbon, and reversely, this time becomes prolonged in accordance with either the increase in the length of the cutting size or the decrease in the advancing speed of the glass ribbon. Accordingly, these set points to be set in the auto-preset counter 20 are arranged within the range of time for the glass ribbon to advance by one length of the cutting size, taking into consideration the advancing speed of the glass ribbon and the length of the cutting size and are set in the respective circuit. In general, when the time necessary for one cutting operation by the cutter 5 is shortened, the set points $a_2$ and $a_4$ are reduced and the stopping and waiting times of the cutter 5 are shortened. On the other hand, when the time necessary for one cutting operation by the cutter 5 is prolonged, these set points $a_2$ and $a_4$ are increased and the stopping and waiting times of the cutter 5 are prolonged.

In practice of the present invention, the advancing speed of the glass ribbon being conveyed by the conveyor rollers in the predetermined direction is measured accurately by means of the wheel 17. In FIG. 5, the detection of this speed of the glass ribbon is performed at G, and the result of this detection is transmitted to the pulse generator 19 at H in FIG. 5, and is transformed to the pulse therein. The said pulse emitted from this pulse generator is fed to the gate I of the auto-preset counter 20 disposed adjacent the said pulse generator 19, and its frequency is calculated by means of the calculating circuit $(f)$, and at the time of the operation of the said circuit $(s)$ of the auto-preset counter 20, the pulses get in the gate II during the time corresponding to its set point $a_1$, and its output is transferred to the driving unit after being amplified in the power circuit.

Furthermore, at the time of the operation of the circuit $(c)$, the said pulses get into the gate III during the time corresponding to the set point $a_3$, and then, after similarly being amplified in the output circuit J, is transferred to the driving unit 21. Also, at the time of the operation of other circuit $(b)$ or $(d)$, during the times corresponding to the said set points $a_2$ or $a_4$ which were previously set, the said pulses are not sent.

The pulses of the said set point $a_1$ emitted from the gate II of the auto-preset counter 20 get into the driving unit 21 from the positive gate and after adjusting the pulses and the phase distribution herein, is fed to the electrical oil pulse motor 12, and this electrical oil pulse motor 12 is rotated in a clockwise direction. On the other hand, the pulses of the set point $a_3$ emitted from the gate III of the auto-preset counter 20 get into the negative gate of the driving unit 21 and after adjusting the pulses and the phase distribution and transforming the pulses into the reverse form is transferred to the said electrical oil pulse motor 12. The said electrical oil pulse motor 12 is reversely rotated in an anti-clockwise direction by means of the said pulse, and this electrical oil pulse motor 12 stands still without being rotated at the time of the operation of the control circuits $(b)$ and $(d)$, because any pulses are not transferred from the said auto-preset counter 20. When the operation of the last control circuit $(d)$ of the auto-preset counter 20 is completed, the zero-returning circuit operates and again returns to the first circuit $(a)$. In this way, the similar operations are repeated successively.

Accordingly, in this invention, even if a change occurs in the advancing speed of the glass ribbon 1 being carried forward by the conveyor during the cutting operation, its speed is accurately detected by means of the detecting means, and its result is immediately calculated in the calculating circuits $(e)$ of the auto-preset counter 20 and the speed of the pulse motor 12 is changed with the result that the cutting speed of the cutter can be maintained always in the speed proportional to that of the advancing speed of the glass ribbon 1.

Also, when the set point $a_3$ is set in the control circuit $(c)$ of the auto-preset counter so as to increase the frequency of the pulse per unit time, it is apparent to be able to reduce the time for "Returning" stage by speed up of the returning speed of the cutter, in which case, it is preferred to provide additionally with a further control circuit on the control circuit $(c)$.

Furthermore, the glass ribbon 1 scored transversely by the cutter is cracked-off or cut-off recurrently along the scored line by its own weight or by imparting the impact thereto from outside, and then taken out.

Moreover, in this invention, there is a case where the advancing speed of the glass ribbon measured by the detecting means for the speed of the glass ribbon does not show accurately the true correct speed of the glass ribbon, because of the occurrence of a mechanical error inherent in the detecting means or a measuring error resulting from the surface conditions of the glass ribbon. This tendency is very remarkable, especially in case of the figured glass sheet. By this reason, in the apparatus of this invention, there is provided with a correcting means in the pulse generator or in the auto-preset counter, which corrects the measured value in case of incorrect measurement of the speed of these glass ribbons and then causes the cutter to be driven against the correctly advancing speed of the glass ribbon.

What we claim is:

1. An apparatus for automatically cutting a glass ribbon which comprises a roller conveyor which carries forward a glass ribbon formed continuously from molten glass; a guide rail bridged across and above said roller conveyor in a direction oblique to the advancing pathway of the glass ribbon at an inclination angle $\theta$; a cutter attached to the said guide rail so as to be able to move relatively to the glass ribbon and to score the surface thereof transversely; a pulse motor which causes the cutter to make a reciprocating movement along the guide rail; a device for detecting the advancing speed of the said glass ribbon; a pulse generator for transforming the detected result to the pulses and translating the said pulses as frequency, the said pulse motor being rotated in conjunction with the pulses sent from the pulse generator and the cutting speed of the cutter being always maintained so as to be proportional to the advancing speed of the said glass ribbon.

2. An apparatus as defined in claim 1, wherein the inclination angle $\theta$ of the guide rail disposed in a direction oblique to the direction of the advancing pathway of the glass ribbon is adjusted in accordance with the said advancing speed of the glass ribbon within a range of about 5° to 15°.

3. An apparatus as defined in claim 1, wherein the inclination angle $\theta$ of the guide rail disposed in a direction oblique to the direction of the advancing pathway of the glass ribbon is adjusted in accordance with cutting size within a range of about 5° to 15°.

4. An apparatus as defined in claim 1, further comprising as wherein auto-preset counter provided with control circuits $(a)$, $(b)$, $(c)$ and $(d)$ for operating the pulse motor so as to cause the cutter to make a reciprocating movement along the guide rail in a recurrent manner and to produce recurrently a transverse score line on the glass surface as well as with a zero-return circuit $(e)$ for operating these circuits $(a)$, $(b)$, $(c)$ and $(d)$ repeatedly after they have operated in chain order, with a set point $a_1$ for the "Cutting" of the cutter set in said circuit $(a)$, a set point $a_2$ for "Stopping" of the cutter set in said circuit $(b)$, a set point $a_3$ for "Returning" of the cutter set in said circuit $(c)$ and a set point $a_4$ for "Waiting" of the cutter set in said circuit $(d)$.

5. A method of automatically cutting a glass ribbon which comprises moving a cutter provided on a guide rail disposed obliquely to a direction of a roller conveyor by way of a pulse motor driven through the pulses emitted from a pulse generator in the following four steps:

cutting—for the cutter to effect scoring of the glass ribbon while running along the guide rail in contact with the glass surface, stopping—for the cutter to stand still at the side end until the start of the return movement is commenced, returning—for the cutter to return to its original position in spaced relation to the glass surface, and waiting—for the cutter to provide for the next cutting operation at its original position;

determining the advancing speed $v$ of the glass ribbon by means of a detecting device; translating the thus detected advancing speed of the glass ribbon as frequency of the pulses by means of a pulse generator; sending the pulses to a pulse motor through an auto-preset counter arranged in combination with said pulse motor; rotating this pulse motor in conjunction with the pulses through the control circuits contained in the auto-preset counter; determining the cutting speed $V$ of the cutter so as to be $$V = v/\sin \theta$$

wherein $V$ represents the cutting speed of the cutter, $v$ represents the advancing speed of the glass ribbon and $\theta$ represents the inclination angle of the guide rail disposed obliquely to a direction of the advancing pathway; and producing the desired transverse score line recurrently on the glass ribbon being carried forward on the roller conveyor at predetermined intervals by the reciprocating movement of the cutter along the guide rail.

References Cited by the Examiner

UNITED STATES PATENTS

| | | | |
|---|---|---|---|
| 1,341,262 | 5/1920 | Colburn | 225—965 X |
| 2,538,972 | 1/1951 | Magnani | 83—100 X |
| 2,716,450 | 8/1955 | Nicholson | 83—76 |
| 2,834,156 | 5/1958 | Oberlin | 225—96.5 |
| 3,048,751 | 8/1962 | Taylor | 83—76 X |
| 3,141,589 | 7/1964 | Jochim | 225—96.5 X |
| 3,181,403 | 5/1965 | Sterns et al. | 83—76 |

WILLIAM W. DYER, Jr., *Primary Examiner.*

J. M. MEISTER, *Examiner.*